United States Patent [19]
Suzaki et al.

[11] 3,967,887
[45] July 6, 1976

[54] SYSTEM FOR CONTROLLING PROJECTION OF IMAGE INFORMATION RECORDING MEDIA

[75] Inventors: Kuniyoshi Suzaki, Machida; Masanori Uchidoi, Kawasaki, both of Japan

[73] Assignee: Canon Kabushiki Kaisha, Tokyo, Japan

[22] Filed: Feb. 8, 1974

[21] Appl. No.: 440,736

[30] Foreign Application Priority Data
Feb. 15, 1973  Japan .............................. 48-18604

[52] U.S. Cl. .............................. 352/92; 352/91 R; 352/236
[51] Int. Cl.² .......................................... G03B 21/50
[58] Field of Search ........................ 352/91, 92, 236

[56] References Cited
UNITED STATES PATENTS

| | | | |
|---|---|---|---|
| 3,664,735 | 5/1972 | Metzger | 352/92 |
| 3,702,728 | 11/1972 | Winkler et al. | 352/92 |
| 3,851,959 | 12/1974 | Kreutze et al. | 352/92 |

OTHER PUBLICATIONS
IBM Technical Disclosure Bulletin, vol. 11, No. 10, Mar. 1969 p. 1191.

Primary Examiner—Russell E. Adams, Jr.
Attorney, Agent, or Firm—Fitzpatrick, Cella, Harper & Scinto

[57] ABSTRACT

A pair of signals optically different in consistency is placed on an image information recording film to be projected. A projector is provided with at least a pair of light detection elements in a position where signals may be detected. The difference between outputs from the elements is utilized as a detection signal. The above-described signals are detected by way of an ordinary speed of the film so as to automatically switch the projection mode thereof to other projection modes, such as a still projection mode, a slow motion projection mode, a fading projection mode, and still projection mode for the search and after the search. For this purpose there are provided with a control circuit for processing the output of the detection element and a drive mechanism for providing the respective projection mode in response to the output signal from the control circuit.

34 Claims, 15 Drawing Figures

FIG. 5
FIG. 7
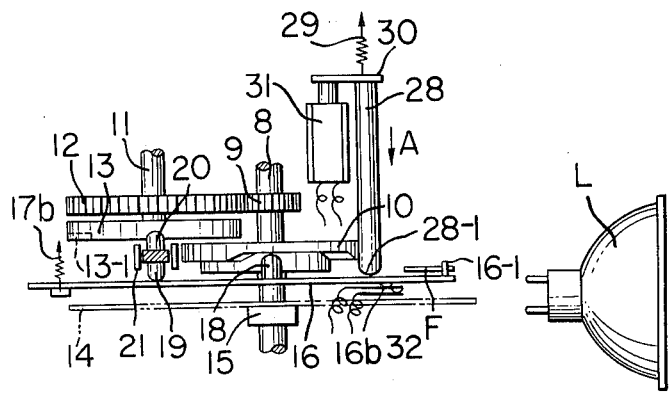
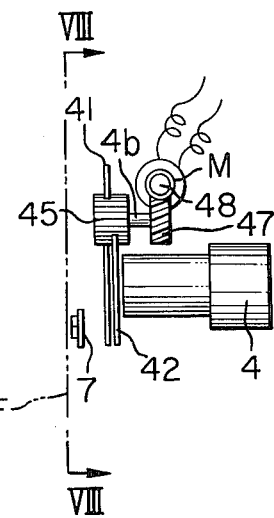
FIG. 6
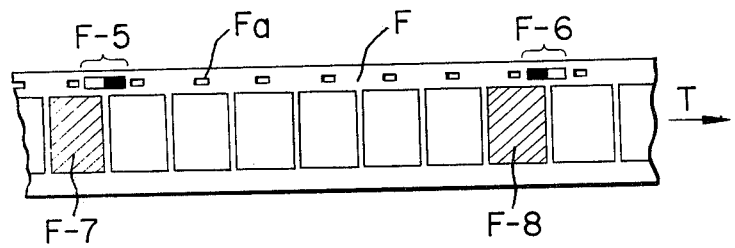
FIG. 8A
FIG. 8B
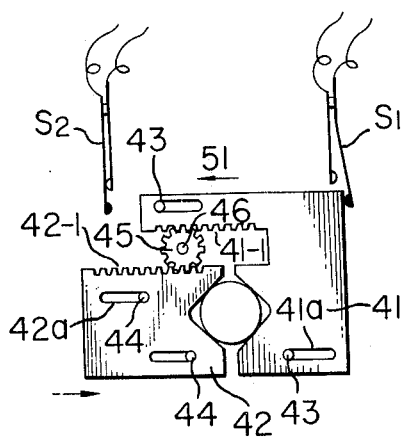
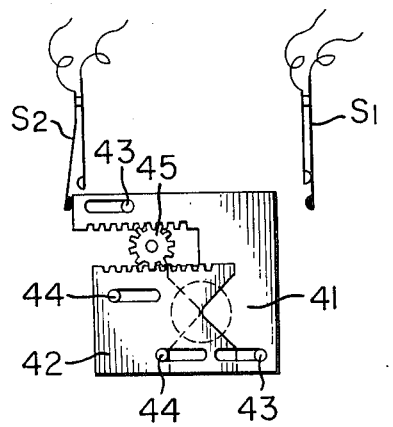

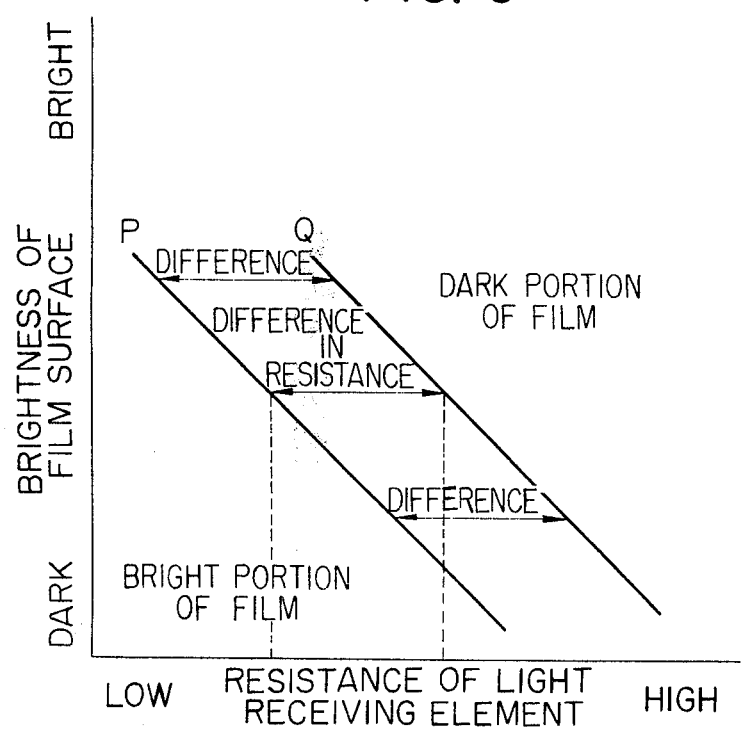

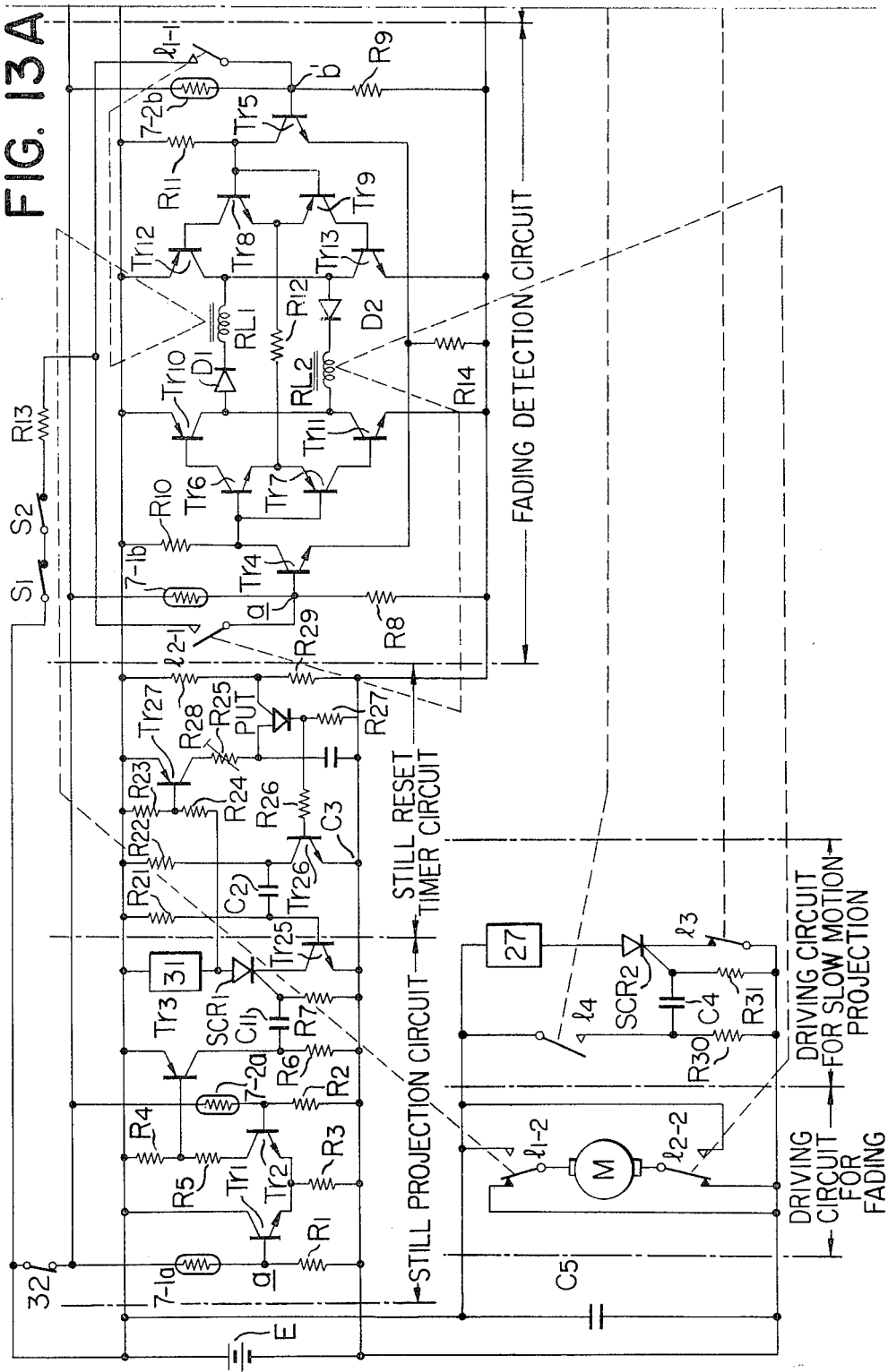

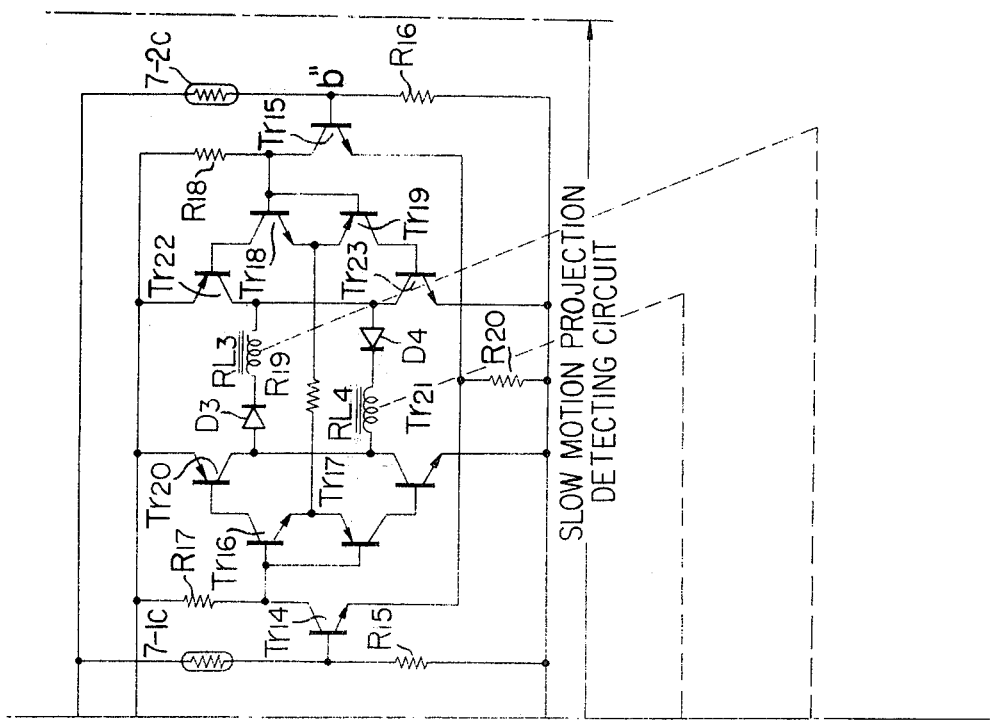

SYSTEM FOR CONTROLLING PROJECTION OF IMAGE INFORMATION RECORDING MEDIA

BACKGROUND OF THE INVENTION

1. Field of the Invention

The present invention relates to systems for controlling projection mode of image information recording media such as a roll of film and the searching mode of image being projected, and more particularly to a control device which is adapted to selectively switch an image-recorded film from its normal projection mode to other projection modes, such as a still projection mode, a slow motion projection mode, and a fading projection mode, or to switch it to searching and projection mode of each frame of an image.

2. Description of the Prior Art

A device has been disclosed in U.S. Pat. No. 3,290,987, in which code marks are provided on a roll of film, and said marks are detected to effect searching information recorded on the film.

A device has been disclosed in U.S. Pat. No. 3,520,596, which provides a film projector, wherein code marks for still projection are interposed in perforations of the projection film, and said marks are optically detected so as to switch the film projection mode from its ordinary projection mode to still projection mode.

The profile of such code marks is such that a plurality of marks of the optically same consistency is provided, or the difference of consistency is utilized to form a signal station of a given pattern profile and said pattern is varied each frame to serve as a searching number signal for said frame. The signals used in such prior arts, however, have such drawbacks that in case of a single code mark easily detectable, erroneous detection will often occur, and on the contrary, in case of a patterned signal, a method for recording signals becomes complicate.

SUMMARY OF THE INVENTION

An object of the present invention is to eliminate various disadvantages noted above with respect to prior art devices and to provide a system for controlling projection of image information recording media, in which said image information recording medium is provided with at least a pair of signal stations optically different in consistency, and a pair of light detection means is arranged corresponding to said signal stations to be positioned corresponding to light and shade of said signal stations to utilize output signals of said detection means in order to simplify the provision of signals as a code mark and to improve erroneous reading when signal is read out.

Another object of the invention is to provide a system for controlling projection of image information recording media, in which a pair of light detection means is disposed, corresponding to a pair of signal stations optically different in consistency, in a position reading out the signal stations having the respective consistency, and change of light in accordance with the difference of consistency in said signal stations is differentially detected to thereby switch projection mode of said image recording medium provided with said signal stations.

Yet another object of the invention is to provide a system for controlling projection of image information recording media, in which at least a pair of signal optically different in consistency provided on the image information recording medium is utilized so that an ordinary projection mode of said image information may selectively be switched to a suitable mode out of other projection modes such as a still projection mode, a slow motion projection mode, a fading projection mode, or projection mode of the image information searched or thereafter searched.

Still another object of the invention is to provide a system in which a plurality of pairs of signal optically different in consistency provided on the image information recording medium is used to thereby sequentially control an ordinary projection mode of said image information, a still projection mode in which the still projection time can be self-controlled, a slow motion projection mode, a fading projection mode effecting fade-out and fade-in, and a mode for searching desired image information and projecting thereof.

Other objects and advantages of the present invention will become apparent from the following detailed description of the preferred embodiments taken in conjunction with the accompanying drawings.

BRIEF DESCRIPTION OF THE DRAWINGS

FIG. 5 is a side view in partial section taken along line V—V of the device shown in FIG. 4;

FIG. 6 is a plan view illustrating the embodiment of the image recording medium provided with two kinds of a pair of signal stations optically different in consistency shown in FIG. 2;

FIG. 7 is a front elevation view illustrating the embodiment in which the present invention is applied to a device for switching mode to fading projection of the projector;

FIG. 8 is a side view taken along line VIII—VIII of the device shown in FIG. 7, wherein FIG. 8A illustrating a state where the fade-out projection is started while FIG. 8B illustrating a state where the fade-out projection is terminated;

FIG. 9 is graphic representation showing the characteristics of a light detector applicable to the system according to the present invention;

FIG. 12 is a plan view of the image information recording medium applied to the system according to the present invention provided with plurality of pairs of signal stations optically different in consistency;

FIG. 13 is a composite of FIGS. 13A & 13B which in turn are circuit diagrams showing an electric circuit connection for automatically and sequentially switching mode of projection of the image information recording medium shown in FIG. 12; and

DESCRIPTION OF THE PREFERRED EMBODIMENTS

Figure 1:
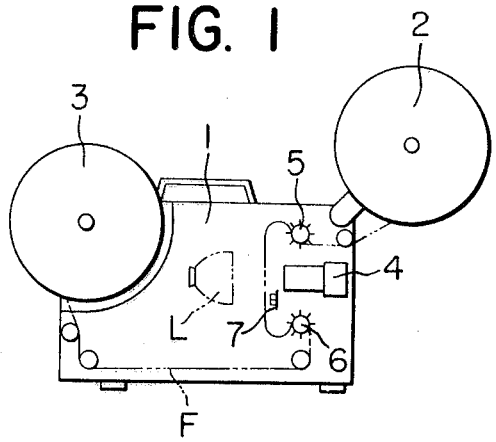
FIG. 1 is a front elevation view illustrating the exterior of one embodiment of a projector to which the system according to this invention may be applied.

FIG. 1 illustrates the exterior of a projector 1 applicable to the system according to the present invention, and a film F with image information recorded thereon is drawn out from a supply reel 2 and is wound on a take-up reel 3. In the figure there are shown a projection lens 4, a pair of sprokets 5 and 6, a projection light source L, and a pair of light detectors 7 disposed in a position corresponding to signal-providing portions to be able to read out signals on the film later to be described.

Figure 2:
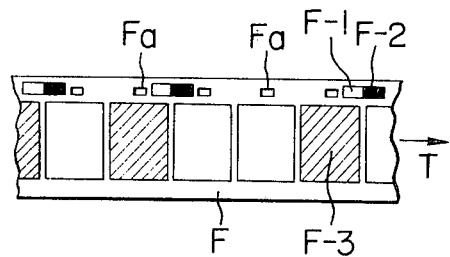
FIG. 2 is a plan view illustrating one embodiment of image recording media provided with control signals applied to the system in accordance with the present invention.
Figure 3:
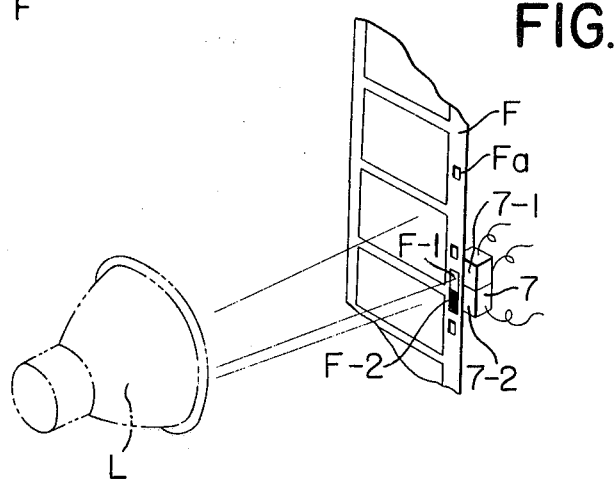
FIG. 3 is a perspective view of the principle portion illustrating a state of the image recording medium, shown in FIG. 2, being projected.

FIG. 2 illustrates a portion of a roll of film projected by means of the above-described projector, and FIG. 3 illustrates the positional relationship at the time of projecting and detecting image information recorded on said film and signals. In FIGS. 2 and 3, there is shown perforations at Fa in the film F. Signals of said film F for controlling the switching of the hereinafter described projection modes comprise a pair of signals extremely different in optical difference of consistency of light and shade, and these signals may be provided within a plane of image information, but preferably provided in such a place as not to influence on the image, for example, between perforations Fa. This signal station forms a pair of signal stations by combination of a signal station F-1 of the lowest consistency and a signal station F-2 of the highest consistency, irrespective of the optical consistency at the place where signals are provided. This signal-providing portion is positioned corresponding to a given image recording frame position F-3 where mode of projection is switched. In the embodiment illustrated in FIG. 2, a pair of signals F-1 and F-2 is arranged in parallel with the travel direction of the film. However, arrangements other than those described above may be employed, for example, they may be arranged in a direction at right angles, or if necessary, two signal stations of light and shade may be made more than two signal stations different in optical consistency, as hereinafter described. A pair of light detectors 7-1 and 7-2 is arranged corresponding to the number of signal stations in a position which receives light which has passed through the above-described signal stations different in difference of consistency, when the image on the film F is projected by the light from the projection light source L, as shown in FIG. 3.

Figure 4:
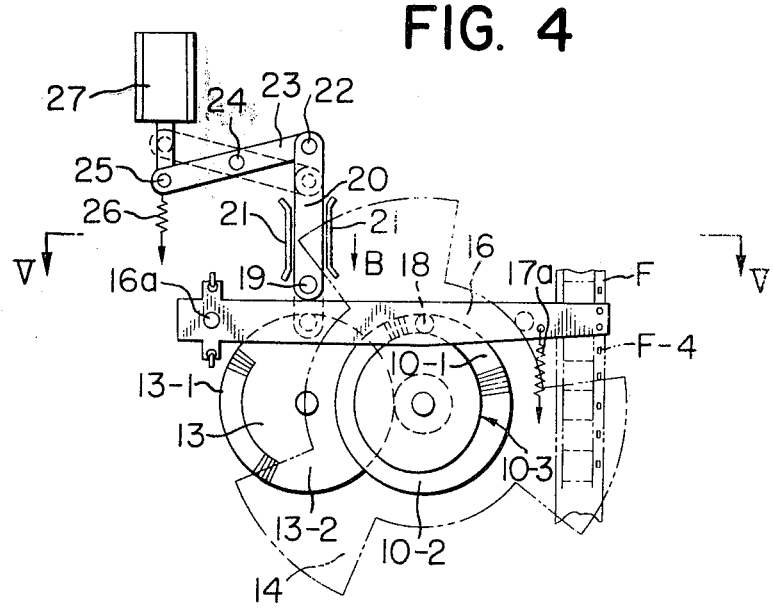
FIG. 4 is a plan view illustrating the embodiment in which the present invention is applied to a device for switching mode from still projection to slow motion projection.

FIGS. 4 and 5 illustrate the embodiment in which mode of projection of the film F is switched from its ordinary intermittent feeding of the number of frames to still projection or slow motion projection. In these figures, a main shaft 8 is rotated by drive means such as a motor not shown. On the main shaft is mounted a boss 15 which supports a gear 9, a cam 10, and a shutter blade 14, and which is rotatable in integral with said shaft. To a lay shaft 11 are secured a gear 12 meshed with the gear 9 and a cam 13 for slow motion. A film feeding lever 16 provided with a film feeding claw 16-1 is supported by means of a shaft 16a planted on the projector body and has at its center a follower 18 in engagement with said cam 10 and at its end said feeding claw 16-1. This follower 18 is biased by means of springs 17a and 17b so as to engage with the main cam 10. The main cam 10 is of a conventional cam profile and comprises a peripheral cam 10-3 which vertically moves the film feeding claw 16-1 in FIG. 4, and face cams 10-1 and 10-2 placed into and out of engagement with the perforations. On the opposite ends of a lever 23 supported by means of a shaft 24 planted on the body, a plunger 27 for slow motion and a control bar 20 for slow motion are rotatably connected by means of a pin 25 and a pin 22, respectively. This lever 23 is usually urged by means of a spring 26 so that the lever is positioned as indicated in a full line. The position of the control lever 20 for slow motion is controlled by means of a pair of guide members 21 and 21. A follower 19 is mounted at the lower end of the bar 20 and enters between the feeding claw lever 16 and the cam 13 for slow motion, as indicated in dashed lines in the figure, upon energization of the plunger 27.

As shown in FIG. 5, a lever 28 for still projection is coupled with a plunger 31 for still projection through a connecting member 30 and is usually pulled by means of a spring 29 so that the extremity 28-1 of the bar 28 is disengaged from the feeding claw lever 16. Contact 32 may be closed by a projection 16b on the lever 16 and is placed in a closed condition only when the feeding claw 16-1 is disengaged from the film F. This may be of course replaced by other switch means of the type similar thereto.

The operation of switching the projector from its ordinary projection mode of the intermittent feeding to mode of still projection or slow motion projection will now be described with reference to FIGS. 1-5.

Still Projection

Under normal projection, the main shaft 8 rotates in the proper number of revolutions, the film feeding claw lever 16 is urged by action of the springs 17a and 17b, and the follower 18 engages with the peripheral cam 10-3 and the face cams 10-1 and 10-2 of the main cam 10 and is driven in a conventional manner in accordance with these cam profiles, thus causing the film feeding claw 16-1 to move along a predetermined locus and to intermittently travel the film F. The speed of this normal film feeding operation is at a rate of 18 frames per second, for example, for a 8-mm motion picture film.

When reached a predetermined frame F-3 of the film F as shown in FIG. 2, a pair of signals F-1 and F-3 is detected by means of a light detector 7, and this detector 7 produces a control signal, according to the hereinafter described electric circuit connection, which is transmitted to the plunger 31 for still projection to actuate said plunger. Thus, the bar 28 for still projection is driven through the connecting member 30 against the spring 29 and moved in the A direction as shown in FIG. 5, and the extremity 28-1 thereof is placed in engagement with the feeding claw lever 16 to thereby cause the lever to be displaced against the springs 17a and 17b and cause the feeding claw 16-1 to be withdrawn from a position engageable with the perforation Fa in the film F. The motion for feeding the film F is thus stopped to initiate the still projection, time of which corresponds to the time in which the plunger 31 is energized.

A switch 32 is provided as safety switch means which forms an energization circuit for the plunger, wherein in consideration of a case of producing a signal for shifting to still projection in the midst of the film feeding depending upon the position where the control signals F-1 and F-3 are provided, a signal is transmitted to actuate the plunger 31 for still projection only during the stoppage of the film feeding.

Slow Motion Projection

Control signals F-1 and F-2 provided in a position corresponding to the predetermined frames of the film F shown in FIG. 2 are detected by means of the light detectors 7-1 and 7-2 to serve as signals for slow motion projection. The signals then energize the plunger 27 for slow motion projection through the electric circuit later to be described, and the slow motion control lever 20 is driven in the B direction in FIG. 4 through the lever 23 against the spring 26, thus reaching the position as indicated in dashed lines. At this time, from a viewpoint of smooth displacement of the bar 20, it is preferred that the positional relationship is established so that the cam face 13-1 of the cam 13 for slow motion comes to a position engageable with the follower 19. For other cases, the follower 19 is moved while depressing the feeding claw lever 16 in FIG. 5. In this way, the follower 19 enters between the cam 13 and the lever 16. Since the slow motion gear 12 is reduced in a predetermined reduction gear ratio, for example, by one-third as compared with the gear 9, the cam 13 for slow motion rotates at a rate of once for every three revolutions of the main cam 10 and therefore, the cam face 10-1 is placed in the same phase as the cam face 13-1 at a rate of once for every 3 revolutions of the main cam. The follower 19 may cause the film feeding claw lever 16 to be displaced upwardly in FIG. 5 only when engaged with the cam face 13-1 and controls such that the feeding claw comes to a position engageable with the perforation in the film F. For other cases, the lever 16 is stopped to function feeding the film. As a result, the slow motion projection may be effected at a speed of one-third (6 frames per second) of the regular projection speed (18 frames per second). Of course, this time means the time in which the plunger 27 is energized. While we have described a particular speed for the slow motion projection, this is a mere example and other modifications may occur.

Next, another mode projection, that is to say fading projection will be described with reference to FIGS. 6–8.

Referring to FIG. 6, there is shown one embodiment of a film arranged in such that a first signal station identical with the signal shown in FIG. 2 is spaced from a second optical signal station in a state reversed in optical consistency by a distance of predetermined number of frames. FIGS. 7 and 8 illustrate the construction of a projector, in which when such a film as described is projected, the above-described two signals are utilized to effect fade-out and fade-in. The film F is provided in the position as described with a first signal station F-6 different in optical consistency and a second signal station F-5 in a state reversed in consistency therefrom, each being positioned opposite a fade-out starting frame F-8 and a fade-in starting frame F-7, respectively, There is shown perforations as at Fa.

In FIG. 7, FIGS. 8A and 8B, there are shown diaphragm blades 41 and 42 which have slots 41a and 42a in engagement with pins 43 and 44 planted on the projector body and are slidably supported by combination of said pins and slots. A drive gear 45 is meshed with rack portions 41-1 and 42-1 of said diaphragm blades 41 and 42, and a shaft 46 is connected to be driven with motor M through a worm gear 47 and a worm gear 48 meshed with the gear 47. Limit switches $S_1$ and $S_2$ are provided to control the start and the termination of the fading, and the switch $S_1$ opens when the diaphragm blades 41 and 42 are opened (see FIG. 8A) while the switch $S_2$ opens when they are fully closed (see FIG. 8B).

Fading Projection

The operation of the switching of the mode of operation of a film from its ordinary feeding projection to fading projection will now be described with reference to FIGS. 6–8.

Upon detection of the signal station F-6 by the light detector 7, the motor M shown in FIG. 7 is rotated in accordance with an electric circuit later to be described, and the drive gear 45 is rotated through the worm 48, worm gear 47, and shaft 46. Thereby, the diaphragm blades 41 and 42 are driven in the directions as indicated by the arrows 51 and 52, respectively, through the rack portions 41-1 and 42-1, to drive light from the projection light source L in the direction in which the light is gradually diaphragmed. In this way, operation of the fade-out is started from the frame F-8 of a film shown in FIG. 6, reaching the condition as shown in FIG. 8B and the light path is completely cut off to open the limit switch $S_2$, thus completing process of the fade-out. Upon further detection of the second signal station F-5 on the film F (it is noted that a distance between the signal F-6 and the signal F-5 is depicted short in the drawing for the easiness of understanding) by the light detector 7, this signal can discriminate the difference from the kind of the first signal and is used as a signal for the start of fade-in. This signal actuates an electric circuit hereinafter described, so that the motor M is run in the direction reverse to that of the aforementioned fade-out, and the diaphragm blades 41 and 42 are driven in the direction reverse to the foregoing in which the diaphragm is opened, thus operation of the fade-in is started from the frame F-7 of the film F. This process will terminate by the opening of the limit switch $S_1$ when reached the condition as shown in FIG. 8A, and thereafter the ordinary film projection process is taken place.

Referring now to FIG. 9, there is shown a system for detecting the signal by means of a light detector applied to the system according to the present invention. In the drawing, the resistance of a light receiving element applied to the light detector is indicated by axis of abscissa, and the brightness of a film surface is indicated by axis of ordinate. A straight line P indicates variation of the resistance of the light receiving element 7-1 for detecting the signal station F-1 (see FIG. 2) low in optical consistency. A straight line Q indicates variation of the resistance of the light receiving element 7-2 for detecting the signal station F-2 (see FIG. 2) high in optical consistency. The resistance for these light receiving elements changes with variation of intensity of illumination of the film surface. As is understood from this characteristic, even if the intensity of illumination of the film surface is varied, the resistance in difference between the lines P and Q scarecely changes. If the intensity of illumination of the film surface is uniform, the resistance of the light receiving element may be kept substantially constant. However, the intensity of illumination of the film surface is inevitably varied due to life of projection light source, change in power voltage, thickness of film, dirt on the film surface, and the like.

However, if the intensity of illumination of the film surface should be varied as shown, at least two signal stations different in optical consistency may be combined, as hereinabove described, to form one control signal to that the resistance in difference between the light receiving elements for detecting said signal is detected, and as a result thereof the value of said difference can be regarded substantially constant without giving rise to a mistake.

Figure 10:
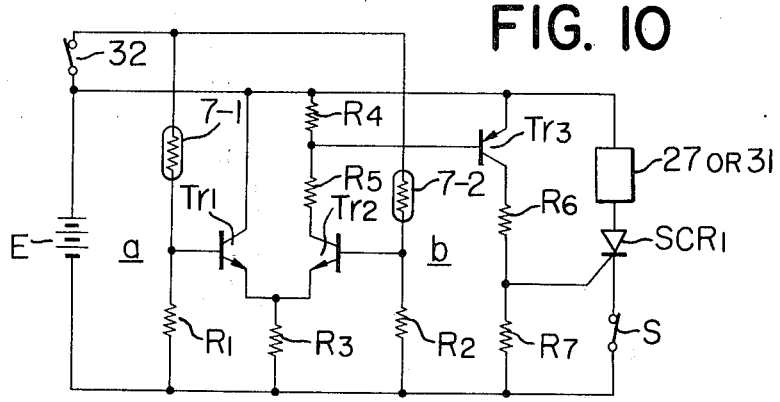
FIG. 10 is an electric circuit connection in which projection mode of the projector applicable to the present invention may be convertibly controlled from its ordinary mode of projection to still projection or slow motion projection.

FIG. 10 is an electric circuit connection for actuating devices which effect still projection and slow motion projection as previously described with reference to FIGS. 4 and 5. A bridge circuit comprises two light receiving elements 7-1 and 7-2, resistances $R_1$ and $R_2$, said light receiving elements constituting the light detector 7, and a pair of transistors $T_{r1}$ and $T_{r2}$ of the same polarity forming a differential amplifier is connected to output terminals $a$ and $b$ in the circuit. There are shown a resistance $R_3$ connected to a common emitter of said transistor, and resistances $R_4$-$R_7$. There are further shown a control transistor $T_{r3}$, plungers 27 and 31 for the aforesaid slow motion projection and still projection, respectively, a silicon rectifier $SCR_1$, a main switch S, a power source E, and a switch 32 which is closed only when said film is stopped.

Resistances $R_1$ and $R_2$ are controlled so that when the light receiving elements 7-1 and 7-1 receive the same brightness, the transistor $T_{r2}$ is placed in non-conductive. When the light receiving element 7-1 receives relatively dark light while the light receiving element 7-2 receives relatively bright light, the resistance of the element 7-2 is not greater than that of the element 7-1, and therefore the base potential of the transistor $T_{r1}$ determined by the potential ratio between the element 7-1 and the resistance $R_1$ becomes lower than the base potential of the transistor $T_{r2}$ determined by the potential ratio between the element 7-2 and the resistance $R_2$. Further, the emitter potential common to transistors $T_{r1}$ and $T_{r2}$ is determined by one of higher base potential of transistors $T_{r1}$ and $T_{r2}$, and therefore the transistor $T_{r1}$ is placed in off condition and a collector current is flown into the transistor $T_{r2}$ to thereby place the transistor $T_{r3}$ in on-condition. Current is flown between emitter and collector of the transistor $T_{r3}$ to thereby pass a gate current into the silicon rectifier $SCR_1$, and the silicon rectifier $SCR_1$ becomes on condition to pass current into the plunger 27 or 31. The switch 32 is opened during the time when film is travelling and closed only when the film is stopped and is interposed between the bridge circuit and the power source E, and therefore, even if light is incident upon the light receiving elements 7-1 and 7-2 in the midst when film is travelling, the light receiving elements are not actuated. Further, when plungers 27 or 31 are desired to be stopped, the main switch S needs to be open.

Figure 11:
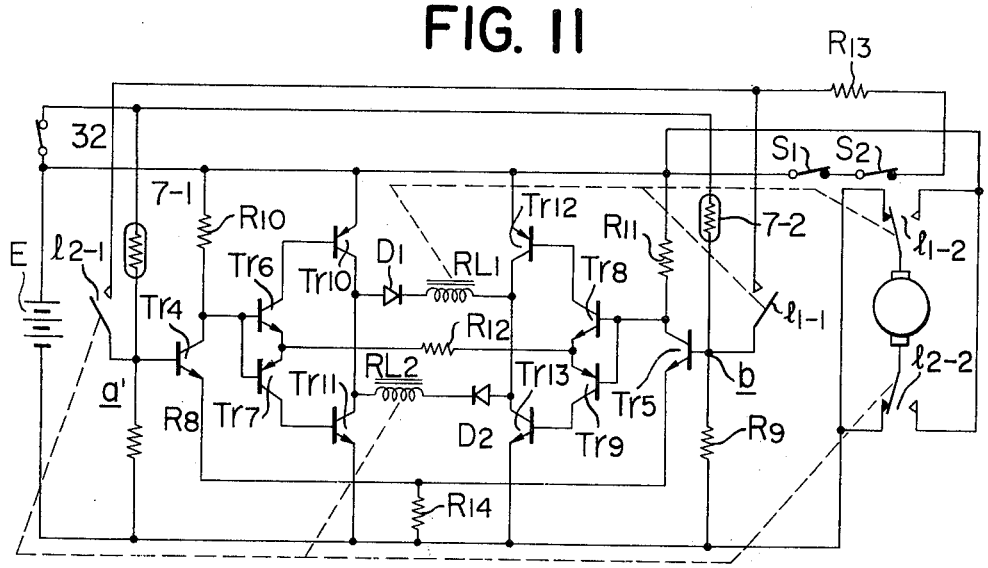

Referring now to FIG. 11, fading projection as previously described in conjunction with FIGS. 7 and 8 will be described. In FIG. 11, there are shown light receiving elements as at 7-1 and 7-2 which complete a bridge circuit together with resistances $R_8$ and $R_9$. Transistors $T_{r4}$ and $T_{r5}$ and resistances $R_{10}$, $R_{11}$, and $R_{14}$ connected to output terminals $a'$ and $b'$, respectively, in the bridge circuit complete a differential amplification circuit. Transistors $T_{r6}$, $T_{r7}$, $T_{r8}$, and $T_{r9}$ complete a first stage complementary amplification circuit, input terminal of which is connected to the output terminal in said differential amplification circuit.

Transistors $T_{r10}$, $T_{r11}$, $T_{r12}$, and $T_{r13}$ complete a second stage complementary amplification circuit, to output terminal of which is connected relays $RL_1$ and $RL_2$. Reverse current prevention diodes are indicated by $D_1$ and $D_2$. Resistances are indicated by $R_{12}$ and $R_{13}$. Switches $l_{1-1}$ and $l_{1-2}$ are controlled by the relay $RL_1$ and are switched from the illustrated normal closed position to the normal open position when the relay is operated. Switches $l_{2-1}$ and $l_{2-2}$ are controlled by the relay $RL_2$ and are switched from the illustrated normal closed position to the normal open position when the relay is operated. Switches $S_1$ and $S_2$ are those as shown in FIGS. 8A and 8B.

The operation of the circuit will now be described. As shown in FIG. 6, the first signal station F-6 and the second signal station F-5 reversed in optical consistency are detected by the light receiving elements 7-1 and 7-2. The difference in quantity of light incident upon the elements 7-1 and 7-2 is turned into the difference in the collector potential of the transistors $T_{r4}$ and $T_{r5}$. When the relatively bright light is incident upon the light receiving element 7-1 while the relatively dark light is incident upon the light receiving element 7-2, (see signal station F-6) the collector potential of the transistor $T_{r4}$ becomes lower than the collector potential of the transistor $T_{r5}$. Consequently, the transistors $T_{r8}$ and $T_{r12}$, and $T_{r7}$ and $T_{r11}$ are shifted to on condition, and current is flown into the relay $RL_2$ through the transistor $T_{r12}$, diode $D_2$, and transistor $T_{r11}$ to place the relay $RL_2$ in the operative condition. With this, the switches $l_{2-1}$ and $l_{2-2}$ are switched from the normal closed position to the normal open position to complete a circuit in the order of the positive terminal of power source E - switches $S_1$, $S_2$ - resistance $R_{13}$ - switch $l_{2-1}$ - transistor $T_{r4}$ - resistance $R_{14}$ - negative terminal of power source E, and the base current is flown into the transistor $T_{r4}$ to maintain the relay $RL_2$ in the operative condition. Further, a circuit is completed in the order of the positive terminal of power source - switch $l_{2-2}$ (normal open side) - motor M - switch $l_{1-2}$ (normal closed side) - negative terminal of power source E, and accordingly, the motor M starts to run and as shown in FIGS. 8A and 8B the throttle is effected to accomplish the fade-out. At the termination of the process, the limit switch $S_2$ is opened and the relay $RL_2$ is shifted to the inoperative condition to cut off the motor drive circuit, thus stopping the motor M.

Next, when the relatively dark light is incident upon the light receiving element 7-1 while the relatively bright light is incident upon the light receiving element 7-2, (see signal station F-5 in FIG. 6) contrary to the former, the collector potential of the transistor $T_{r5}$ becomes lower than the collector potential of the transistor $T_{r4}$, and the transistors $T_{r9}$ and $T_{r13}$, and $T_{r6}$ and $T_{r10}$ are shifted to on condition and current is flown into the relay $RL_1$ through the transistor $T_{r10}$, diode $D_1$, and transistor $T_{r13}$ to transfer the switches $l_{1-1}$ and $l_{1-2}$ to the normal open side. By the reversion of the switch $l_{1-2}$, the motor M is started to run reversely to the former and the limit switch $S_2$ is closed. At this time, current is flown into a circuit of the positive terminal of power source E - switches $S_1$, $S_2$ - resistance $R_{13}$ - switch $l_{1-1}$ - transistor $T_{r5}$ - resistance $R_{14}$ - negative terminal of power source E to maintain the relay $RL_1$ in the on condition, and the motor M is kept run to gradually open the diaphragm, thus providing the fade-out. When fully opened, the limit switch $S_1$ is opened to release said condition, thus stopping the motor M.

The switch 32 functions as a contact in order to establish the synchronized relationship with the film feeding as previously described and is closed only when the feeding claw 16-1 is disengaged from the film F.

Furthermore, the above-described circuits may be applied not only to fading projection but also to overlap projection, etc. and in addition, when mode of projection is switched between other two systems, two control signal stations reversed may be detected.

Figure 12:
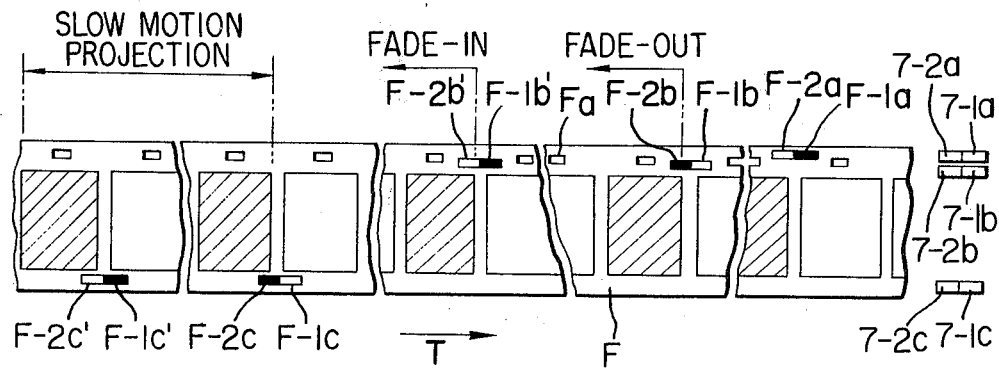
FIG. 12 is an electric circuit connection in which projection mode of the projector applicable to the present invention may be convertibly controlled from its ordinary mode of projection to fading projection.

FIG. 12 illustrates an embodiment in which three sets of control signals different in optical consistency as described above are provided in portions other than an image information recording station of a film F with image information recorded thereon. These signals are preferably arranged between perforations Fa as shown, however the first signals F-1$a$ and F-2$a$ to switch to mode of still projection are provided on the outermost ends of the ends other than image recording frame on the perforation side of a film. The second signals F-1$b$, F-2$b$, and F-1$b'$F-2$b'$ F-2$b'$ to switch to mode of fading projection are arranged on the outside of said frame adjacent the locus where said first signals pass. The third signals F-1$c$, F-2$c$ to switch to mode of slow motion projection are arranged on a portion outside the image recording frame on the side having no perforations. Light detecting elements 7-1$a$, 7-2$a$; 7-1$b$, 7-2$b$; and 7-1$c$, 7-2$c$ for detecting three kinds of control signals as described are provided on the projector, respectively making a pair, at positions corresponding to respective locus where the signal passes. The film F is travelled in the direction as indicated by the arrow T. It should be understood that the position and arrangement of the signals on the film F may be replaced by arrangements other than those shown in the drawing.

FIG. 13 is an electric circuit connection, in which a projector is sequentially controlled in order that at the time of projecting the film F shown in FIG. 3, the mode is suitably and automatically switched from one projection at a speed of ordinary projection to the other mode of projection in accordance with detection of control signal. This circuit includes therein those circuits as shown in FIGS. 10 and 11 so that the description thereof is simplified in such that like reference characters designate like parts contained in these circuits. In FIG. 13, parts such as resistances $R_1 - R_7$, transistors $T_{r1} - T_{r13}$, a silicon diode rectifier $SCR_1$, and light receiving elements 7-1$a$ and 7-1$b$, which establish a still projection circuit 100, are the same parts as those previously discussed. A capacitor is indicated by $C_{11}$ and a plunger for still projection by 31. A transistor $T_{r25}$ is provided to reset the silicon rectifier $SCR_1$ and used to replace the switch S shown in FIG. 11, and this transistor is turned off so as to control the time till the silicon rectifier $SCR_1$ is relieved. A timer 101 for releasing still projection is connected to said transistor. This time circuit comprises resistances $R_{25}$, $R_{27}$, $R_{28}$, and $R_{29}$, a programmable unijunction transistor PUT, and a capacitor $C_3$. A timer control circuit comprises resistances $R_{23}$, $R_{24}$, and a transistor $T_{r27}$, and a $SCR_1$ resetting drive circuit comprises resistances $R_{21}$, $R_{22}$, $R_{26}$, a transistor $T_{r26}$, and a capacitor $C_2$.

Since fading detection circuit 102 and fading drive circuit 102' connected to power source E together with the aforesaid circuits 100 and 101 have the same construction as those described in FIG. 11, the description thereof is not further given. However, light receiving elements 7-1$b$ and 7-2$b$ correspond to the light receiving elements 7-1 and 7-2 as previously described.

Further, in constructions of a slow motion detection circuit 103 and slow motion drive circuit 103' similarly connected to the power source E, the detection circuit 103 has its construction same as the above-described fading detection circuit, and light receiving elements 7-1$c$ and 7-2$c$ correspond to the elements 7-1$b$ and 7-2$b$, respectively. The slow motion drive circuit 103' is provided with a switch $l_3$ controlled by the relay $RL_3$ and a switch $l_4$ controlled by the relay $RL_4$, and further provided with resistances $R_{30}$ and $R_{31}$, a capacitor $C_4$, and a silicon diode rectifier $SCR_2$. A plunger for slow motion is indicated at 27, which is connected in series with a silicon diode rectifier $SCR_2$ and switch $l_3$.

The operation will now be described with reference to FIGS. 12 and 13.

This operation is concerned such that when film F is projected while travelling it in the direction as indicated by the arrow in the drawing, the respective control signal on the film F is detected to thereby automatically switch the mode of projection from projection at a speed of ordinary projection to still projection, fading projection or slow motion projection, and to return to the ordinary mode of projection. This will be described further in conjunction with the description made referring to FIGS. 10 and 11.

It is presumed that when film F is subjected to normal projection, the light detection elements 7-1$a$ and 7-2$a$ have detected the respective signals F-1$a$ and F-2$a$. In a case in which the light receiving elements 7-1$a$ and 7-2$a$ receive light of the same brightness, the resistances $R_1$ and $R_2$ are controlled so that the transistor $T_{r2}$ is placed in non-conductive. Since the light receiving element 7-1$a$ receives relatively dark light and the light receiving element 7-2$a$ receives relatively bright light, the transistor $T_{r1}$ becomes off condition and the collector current is flown into the transistor $T_{r2}$ to thereby place the transistor $T_{r3}$ in on condition. Whereby, the gate current is flown into the silicon diode rectifier $SCR_1$, and therefore the rectifier $SCR_1$ becomes on condition to energize the plunger 31, thus starting still projection. The base current of the transistor $T_{r27}$ is flown passing through the resistance $R_{24}$ to place the transistor $T_{r27}$ in on condition, thus starting the charge of the capacitor $C_3$ through the variable resistance $R_{25}$. When the capacitor $C_3$ is charged up to on-voltage of the programmable unijunction transistor PUT determined by the resistances $R_{28}$ and $R_{29}$, the transistor PUT is placed in on condition, and pulses are produced from the cathode of the transistor PUT and are transmitted to the transistor $T_{r26}$ through the resistance $R_{26}$ to turn the transistor $T_{r26}$ on. Turning on of the transistor causes the transistor $T_{r26}$ to be turned off through the capacitor $C_2$ so that the silicon diode rectifier $SCR_1$ is placed in off condition to release the plunger 31, thus releasing mode of still projection and thus returning to the ordinary mode of projection. That is to say, the projector maintains still projection of the still projection frame STF shown in FIG. 12 for the time by time constant determined by the variable resistance $R_{25}$ and the capacitor $C_3$.

When the signals F-1$b$ and F-2$b$ are detected by the light receiving elements 7-1$b$ and 7-2$b$ as normal projection proceeds, the difference in quantity of light flux incident upon the elements is turned into the difference in the collector potential of the transistors $T_{r4}$ and $T_{r5}$.

When relatively bright light is incident upon the light receiving element 7-1b and relatively dark light is incident upon the element 7-2b, the collector potential of the transistor $T_{r4}$ becomes lower than the collector potential of the transistor $T_{r5}$, in the manner similar to that described with reference to FIG. 12. Accordingly, the transistors $T_{r8}$ and $T_{r12}$, and $T_{r7}$ and $T_{r11}$ are shifted to on condition, and as a result the relay $RL_2$ is placed in operative condition. Whereby, the switches $l_{2-1}$ and $l_{2-2}$ are transferred from the illustrated normal closed position to the normal open position and the relay $RL_2$ is self-held, and the motor M is started to run and the diaphragm is diaphragmed as shown in FIGS. 8A and 8B, accomplishing the fade-out. At the time of termination, the limit switch $S_2$ is opened to release the relay $RL_2$ and to stop the motor M.

Next, when relatively dark light passed through the signal F-1b' is incident upon the light receiving element 7-1b while relatively bright light passed through the signal F-2b' is incident upon the element 7-2b, transistors $T_{r9}$, $T_{r13}$, $T_{r6}$, and $T_{r10}$ become on condition to the contrary of the former case, and the relay $RL_1$ is placed in operative condition and the switches $l_{1-1}$ and $l_{1-2}$ are switched to the normal open side. Whereby, the fade-in is effected as hereinbefore described with reference to FIG. 11, and the limit switch $S_1$ is opened to return to normal projection.

Next, when relatively bright light from the signal F-1c is incident upon the light receiving element 7-1c while relatively dark light from the signal F-2c is incident upon the element 7-2c, the collector potential of the transistor $T_{r19}$ becomes lower than the collector potential of the transistor $T_{r15}$. Whereby, the transistors $T_{r8}$, $T_{r12}$, $R_{r7}$, $T_{r11}$ are shifted to on condition, and current is flown into the relay $RL_4$ through the transistor $T_{r22}$, diode $D_4$, and transistor $T_{r21}$ to place said relay in operative condition. Then, contact $l_4$ is closed to apply a pulse to the gate of the silicon diode rectifier $SCR_2$ and to turn on the rectifier $SCR_2$, thus placing the plunger 27 for slow motion projection in conductive condition. Whereby, slow motion projection may be effected by the mechanism shown in FIGS. 4 and 5.

Next, when relatively dark light from the signal F-1c' is incident upon the element 7-1c and relatively bright light from the signal F-2c' is incident upon the element 7-2c, the collector potential of the transistor $T_{r15}$ becomes lower than the collector potential of the transistor $T_{r14}$ to the contrary of the former case, and the transistors $T_{r19}$ and $T_{r23}$, and $T_{r16}$ and $T_{r20}$ are shifted to on condition, current is then flown into the relay $RL_3$ through the transistor $T_{r20}$, diode $D_3$, and transistor $T_{r23}$, and contact $l_3$ is opened to release the silicon diode rectifier $SCR_2$ and to release operation of the plunger 27, thus terminating slow motion projection and then returning to normal mode of projection.

The signal different in optical consistency applied to the system according to the present invention is sufficient to include a first signal portion of optically low consistency and a second signal portion adjacent said first signal portion of high consistency to such extent that the optical consistency is substantially different from the first signal portion, and arrangement thereof may be made in parallel, at right angles, or other suitable direction relative to the travelling direction of a film.

The foregoing embodiments of the present invention are for descriptive purposes only, and it is to be understood that the invention is not limited to the specific embodiments thereof and various modifications and applications may be made within the spirit of the present invention.

From the foregoing, in accordance with the present invention, signal stations extremely different in optical consistency are combined to provide one control signal station, which is placed on the image information recording medium such as a film and said control signal may be read out and controlled with extreme accuracy and without giving rise to any erroneous detection even if brightness of the film surface should be varied due to change such as brightness of projection light source at the time of reproducing the image, and further the present invention has the advantage to provide a system, which is simpler and higher in detection accuracy than similar prior art methods and devices.

We claim:

1. In an image presentation system, wherein a film having recorded thereon images to be projected is converted from an ordinary projection mode to another projection mode, different from the former, by detection means which detect an indicia placed on the film, the improvement which comprises:
   a. a film having:
      1. a plurality of image information frames, on which image information is recorded, said information frames being provided linearly in the moving direction of the film at equally spaced intervals;
      2. a projection mode information carrying region which is formed of a pair of indicia consisting of a first indicia having a low optical density and providing a relatively high transmission of light during the projection of the film, and a second indicia disposed adjacent said first indicia, having a high optical density with respect to said first indicia, and providing relatively low transmission of light during the projection of said film, and which is for directing change-over of the projection mode from one to another in a series of continuous information frames, said projection mode information carrying region being provided outside said frames and between the frames where the conversion of the projection mode is scheduled; and
   b. a projection apparatus to present said image information on said film, said apparatus having:
      1. driving means to actuate said apparatus;
      2. intermittent film feeding means, which is actuated by the driving force of said driving means, to intermittently feed said film to said projection position;
      3. an information presentation mode conversion means for converting said image information presentation mode of the film, which said apparatus presents, from its ordinary presentation mode to another presentation mode, said information presentation mode conversion means having an indicia detecting means disposed at a position corresponding to the projection mode information carrying region for said film which has been fed to said projection position, and possesses light detection elements corresponding in number to at least said first and second indicia portions;
      4. light irradiation means for the projection, which is actuated in interrelationship with said intermittent film feeding means, and irradiates the projecting light onto said film and projection mode information carrying region for only a predetermined period of time, when said intermittent film feeding means has completed feeding said film to said projection position;

5. control means electrically connected to said indicia detection means to control said information presentation mode conversion means utilizing an output from said detection means, said control means being provided with a circuit which differentially detects the differences in outputs from said detection elements and generates a control signal.

2. The improvement according to claim 1, wherein said information presentation mode conversion means is provided with a stop projection means to convert said intermittent film feeding means from its state of feeding said film at a normal speed to a state wherein it does not feed the film for a predetermined period of time, when said signal detecting means detects said projection mode information carrying region.

3. The improvement according to claim 2, wherein said information presentation mode conversion means is provided with a timer circuit to actuate said stop projection means for only a predetermined period of time.

4. The improvement according to claim 2, wherein said stop projection means is provided with actuating means to nullify the film feeding operation of said intermittent film feeding means, said actuating means comprising: magnetic means excited by an output signal from said control means; and an actuating member mechanically linked with said magnetic means for forcibly displacing said intermittent film feeding means to a position where said intermittent film feeding means is unable to engage said film, when said magnetic means is excited.

5. The improvement according to claim 1, wherein said control means is provided with a bridge-connection type detection circuit which includes first and second light detecting elements of said indicia detection means on one side thereof, said detection circuit being capable of detecting the difference in the outputs between said first and second light detection elements.

6. The improvement according to claim 1, wherein said information presentation mode conversion means is provided with projection speed changing means for changing over from one projection mode at a normal projection speed to another projection mode at a projection speed different from that of the former, when said indicia detection means detects said projection mode information carrying region.

7. The improvement according to claim 6, wherein said projection speed changing means is provided with first and second power transmission mechanisms which are mechanically linked with said driving means, and variable means for causing either one of said power transmission mechanisms to be selectively and mechanically linked with said intermittent film feeding means so as to vary the route of said power transmission for said driving means, said first and second power transmission mechanisms having mutually different speed functions.

8. The improvement according to claim 1, wherein said information presentation mode conversion means is provided with fading projection means to change over from an ordinary projecting mode to a fading projection mode, when said indicia detection means detects said projection mode information carrying region.

9. The improvement according to claim 8, wherein said fading projection means is provided with variable means to effectively change the amount of light which passes through the optical system for projection from said light irradiation means.

10. The improvement according to claim 9, wherein said projecting mode information carrying region is provided with first and second mode conversion indicia having mutually reversed optical density patterns, said first and second mode conversion indicia being disposed outside said frames at positions corresponding to the mutually different frames on the film, said first mode conversion indicia directing change-over from the ordinary image information presentation mode to the fade-out image information presentation mode, and said second mode conversion indicia directing changeover from the fade-out image information presentation mode to the fade-in image information presentation mode.

11. The improvement according to claim 6, wherein said variable means is interposed between said optical system for the projection and said light irradiation means for the projection.

12. The improvement according to claim 11, wherein said variable means is provided with an opening part which permits passage of irradiating light from said light irradiation means for the projection, said opening part being capable of varying the area of the opening in a continuous manner.

13. The improvement according to claim 12, wherein said variable means is provided with first and second sliding members which slidingly displace in mutually opposite directions, said opening part being formed in one part of one of said sliding members.

14. The improvement according to claim 13, wherein said variable means is provided with an auxiliary driving means to relatively and slidingly displace said first and second sliding members.

15. In an image presentation system, wherein a film having recorded thereon images to be projected is converted from an ordinary projection mode to another projection mode, different from the former, by detection means which detect an indicia placed on the film, the improvement which comprises:

a. a film having:
  1. a plurality of image information frames, on which image information is recorded, said information frames being provided linearly in the moving direction of the film at equally spaced intervals;
  2. a projection mode information carrying region which is formed of a pair of indicia consisting of a first indicia having a low optical density and providing a relatively high transmission of light, and a second indicia disposed adjacent said first indicia, having a high optical density with respect to said first indicia, and providing relatively low transmission of light during the projection of said film, and which is for directing changeover of the projection mode from one to another in a series of continuous information frames, said projection mode information carrying region being provided outside said frame and between the frames where the conversion of the projection mode is scheduled, and further having a first projection mode conversion information carrying region for directing the change-over of said film from its ordinary projection mode to its stop projection mode at a position where said information frames do not overlap each other, and a second projection mode conversion information carrying region for directing the change-over of said film from its ordinary projection mode to another projection mode having a different projection speed from the former; and b. a projection apparatus to present said image information on said film, said apparatus having:
  1. driving means to actuate said apparatus;
  2. film feeding means, which is actuated by the driving force of said driving means, to feed said film to said projection position;
  3. an optical projection system for projecting said image information recorded on said film which has been brought to said projection position;
  4. light irradiation means, which is actuated in interrelationship with said film feeding means, to irradiate light onto said film and projection mode information carrying region for only a predetermined period of time, when said film feeding means has completed feeding said film to said projection position; and
  5. information presentation mode conversion means for converting said image information presentation mode of said film, which said apparatus presents, from its ordinary presentation mode to another presentation mode, said conversion means having:
    a. stop projection means for changing over said film from its state of being fed by said film feeding means at a normal speed to a state wherre it is not fed for a predetermined period of time, said stop projection means including:
      1. a first indicia detection means disposed at a position corresponding to the first projection mode conversion information carrying region of said film fed to said projection position, and having light detection elements corresponding in number at least to said first and second indicia portions; and
      2. first control means electrically connected to said first indicia detection means for controlling said stop projection means, utilizing an output from said detection means, said control means having an electrical circuit to differentially detect differences in the output from said light detection elements and to generate a control signal based thereon; and
    b. projection speed changing means to change-over the speed of said film from its state of being fed by said film feeding means at a normal speed to a projection mode at a projection speed different from that of the former, said change-over means including:
      1. a second indicia detection means disposed at a position corresponding to the second projection mode conversion information carrying region of said film fed to said projection position, and having light detection elements corresponding in number at least to said first and second indicia portions; and
      2. a second control means electrically connected to said second indicia detection means for controlling said projection speed changing means, utilizing an output from said detection means, said control means having an electrical circuit to differentially detect differences in said light detection elements and to generate a control signal based thereon.

16. The improvement according to claim 15, wherein said stop projection means is provided with a timer circuit, by which it is actuated for only a predetermined period of time.

17. The improvement according to claim 15, wherein said stop projection means is provided with actuating means to nullify the film feeding operation of said film feeding means, said actuating means comprising: magnetic means excited by an output signal from said control means; and an actuating member mechanically linked with said magnetic means to forcibly displace said film feeding means to a position where said film feeding means is unable to engage said film, when said magnetic means is excited.

18. The improvement according to claim 15, wherein said first control means is provided with a bridge-connection type detection circuit including first and second light detection elements of said first indicia detection means on one side thereof, said detection circuit being capable of detecting the difference in outputs from said first and second light detection elements.

19. The improvement according to claim 15, wherein said second control means is provided with a bridge-connection type detection circuit including said first and second light detection elements of said second indicia detection means on one side thereof, said detection circuit being capable of detecting the difference in outputs from said first and second light detection elements.

20. The improvement according to claim 15, wherein said projection speed changing means is provided with first and second power transmission mechanisms which are mechanically linked with said driving means, and variable means for causing one of said power transmission mechanism to be selectively and mechanically linked with said intermittent film feeding means so as to vary the route of said power transmission for said driving means, said first and second power transmission mechanisms having mutually different speed functions.

21. In an image presentation system, wherein a film having recorded thereon images to be projected is converted from an ordinary projection mode to another projection mode, different from the former, by detection means which detect an indicia placed on the film, the improvement which comprises:

a. a film having:
  1. a plurality of image information frames, on which image information is recorded, said information frames being provided linearly in the moving direction of the film at equally spaced intervals;
  2. a projection mode information carrying region which is formed of a pair of indicia consisting of a first indicia having a low optical density and providing a relatively high transmission of light during the projection of said film, and a second indicia disposed adjacent said first indicia, having a high optical density with respect to said first indicia, and providing relatively low transmission of light during the projection of said film, and which is for directing change-over of the projection mode from one to another in a series of continuous information frames, said projection mode information carrying region being provided outside said frame and between the frames where the conversion of the projection mode is scheduled, and further having a first projection mode conversion information carrying region for directing the change-over of said film from its ordinary projection mode to its stop projection mode at a position where said information frames do not overlap each other, and a second projection mode conversion information carrying region for directing the change-over of said film from its ordinary projection mode to its fading projection mode; and b. a projection apparatus to present said image information on said film, said apparatus having:
  1. driving means to actuate said apparatus;
  2. intermittent film feeding means, which is actuated by the driving force of said driving means to intermittently feed said film to said projection position;
  3. an optical projection system for projecting said image information recorded on said film, which has been brought to said projection position;
  4. light irradiation means for projection, said is actuated by said intermittent film feeding means in interrelationship therewith, and to irradiate light onto said film and said projection mode information carrying region for only a predetermined period of time, when said intermittent film feeding means has completed feeding said film to said projection position; and
  5. information presentation mode conversion means for converting said image information presentation mode of said film, which said apparatus presents, from its ordinary presentation mode to another presentation mode, said conversion means having:
    a. stop projection means for changing-over said film from its state of being fed by said film feeding means at a normal speed to a state where it is not fed for a predetermined period of time, said stop projection means including:
      1. a first indicia detection means disposed at a position corresponding to the first projection mode conversion information carrying region of said film fed to said projection position, and having light detection elements corresponding in number at least to said first and second indicia portions; and
      2. first control means electrically connected to said first indicia detection means for controlling said stop projection means, utilizing an output from said detection means, said control means having an electrical circuit to differentially detect differences in the outputs from said light detection elements and to generate a control signal based thereon; and
    b. fading projection means to change-over said film from its ordinary projection mode to its fading projection mode by said intermittent film feeding means, said fading projection means including:
      1. a second indicia detection means disposed at a position corresponding to the second projection mode conversion information carrying region of said film fed to said projection position, and having light detection elements corresponding in number at least to said first and second indicia portions; and
      2. a second control means electrically connected to said second indicia detection means for controlling said fading projection means, utilizing an output from said detection means, said control means having an electrical circuit to differentially detect differences in the outputs from said light detection elements and to generate a control signal based thereon.

22. The improvement according to claim 21, wherein said stop projection means is provided with a timer circuit, by which it is actuated for only a predetermined period of time.

23. The improvement according to claim 21, wherein said stop projection means is provided with actuating means to nullify the film feeding operation of said intermittent film feeding means, said actuating means comprising: magnetic means excited by an output signal from said control means; and an actuating member mechanically linked with said magnetic means to forcibly displace said intermittent film feeding means to a position where said intermittent film feeding means is unable to engage said film, when said magnetic means is excited.

24. The impovement according to claim 21, wherein said fading projection means is provided with variable means to effectively change the amount of light which passes through the optical system for projection from said light irradiation means.

25. The improvement according to claim 24, wherein said second projection mode conversion information carrying region is provided with first and second mode conversion indicia, having mutually reversed optical density patterns, said first and second mode conversion indicia being disposed outside said frames at positions corresponding to the mutually different frames on the film, said first mode conversion indicia directing the change-over from the ordinary image information presentation mode to the fade-out image information presentation mode, and said second mode conversion indicia directing change-over from the fade-out image presentation mode to the fade-in image information presentation mode.

26. The improvement according to claim 25, wherein said variable means is interposed between said optical system for the projection and said light irradiation means for the projection.

27. The improvement according to claim 26, wherein said variable means is provided with an opening part which permits passage of irradiating light from said light irradiation means for the projection, said opening part being capable of varying the area of the opening in a continuous manner.

28. The improvement according to claim 27, wherein said variable means is provided with first and second sliding members which slidingly displace in mutually opposite directions, said opening part being formed in one part of one of said sliding members.

29. The improvement according to claim 28, wherein said variable means is provided with an auxiliary driving means to relatively and slidingly displace said first and second sliding members.

30. In an image presentation system wherein a film having recorded thereon images to be projected is converted from an ordinary projection mode to another projection mode, different from the former, by detection means which detect an indicia placed on the film, the improvement which comprises:
  a. a film having:
    1. a plurality of image information frames, on which image information is recorded, said information frames being provided linearly in the moving direction of the film at equally spaced intervals;

2. a projection mode information carrying region which is formed of a pair of indicia consisting of a first indicia having a low optical density and providing a relatively high transmission of light during the projection of said film, and a second indicia disposed adjacent said first indicia, having a high optical density with respect to said first indicia, and providing relatively low transmission of light during the projection of said film, and which is for directing change-over of the projection mode from one to another in a series of continuous information frames, said projection mode information carrying region being provided outside said frame and between the frames where the conversion of the projection mode is scheduled, and further having a first projection mode conversion information carrying region for directing the change-over of said film from its ordinary projection mode to its stop projection mode at a position where said information frames do not overlap each other, and a second projection mode conversion information carrying region for directing the change-over of said film from its ordinary projection mode to its fading projection mode; and b. a projection apparatus to present said image information on said film, said apparatus having:
  1. driving means to actuate said apparatus;
  2. intermittent film feeding means, which is actuated by the driving force of said driving means, to intermittently feed said film to said projection position;
  3. an optical projection system for projecting said image information recorded on said film which has been brought to said projection position;
  4. light irradiation means for projections, which is actuated by said intermittent film feeding means in interrelationship therewith, and to irradiate light onto said film and said projection mode information carrying region for only a predetermined period of time, when said intermittent film feeding means has completed feeding said film to said projection position; and
  5. information presentation mode conversion means for converting said image information presentation mode of said film, which said apparatus presents, from its ordinary presentation mode to another presentation mode, said conversion means having:
    a. projection speed changing means for changing-over said film from its state of being fed by said intermittent film feeding means at normal speed to a projection mode at a projection speed different from the former, said projection speed changing means including:
      1. a first indicia detection means disposed at a position corresponding to the first projection mode conversion information carrying region of said film fed to said projection position, and having light detection elements corresponding in number at least to said first and second indicia portions; and
      2. first control means electrically connected to said first indicia detection means for controlling said projection speed changing means, utilizing an output from said detection means, said control means having an electrical circuit to differentially detect differences in outputs from said light detection elements and to generate a control signal based thereon; and
    b. fading projection means to change-over said film from its ordinary projection mode to its fading projection mode by said intermittent film feeding means, said fading projection means including:
      1. a second indicia detection means disposed at a position corresponding to the second projection mode conversion information carrying region of said film fed to said projection position, and having light detection elements corresponding in number at least to said first and second indicia portions; and
      2. a second control means electrically connected to said second indicia detection means for controlling said fading projection means, utilizing an output from said detection means, said control means having an electrical circuit to differentially detect differences in the outputs from said light detection elements and to generate a control signal based thereon.

31. The improvement according to claim 30, wherein said projection speed changing means is provided with first and second power transmission mechanisms which are mechanically linked with said driving means, and variable means which causes one of said power transmission mechanisms to be selectively and mechanically linked with said intermittent film feeding means so as to vary the route of said power transmission for said driving means, said first and second power transmission mechanisms having mutually different speed functions.

32. The improvement according to claim 30, wherein said fading projection means is provided with variable means to effectively change the amount of light which passes through the optical system for projection from said light irradiation means.

33. The improvement according to claim 32, wherein said projection mode information carrying region is provided with first and second mode conversion indicia having mutually reversed optical density patterns, said first and second mode conversion indicia being disposed outside said frames at positions corresponding to the mutually different frames on the film, said first mode conversion indicia directing change-over from the ordinary image information presentation mode to the fade-out information presentation mode, and said second mode conversion indicia directing change-over from the fade-out image information presentation mode to the fade-in image information presentation mode.

34. In an image presentation system wherein a film having recorded thereon images to be projected is converted from an ordinary projection mode to another projection mode, different from the former, by detection means which detect an indicia placed on the film, the improvement which comprises:
  a. a film having:
    1. a plurality of image information frames, on which image information is recorded, said information frames being provided linearly in the moving direction of the film at equally spaced intervals;
    2. a projection mode information carrying region which is formed of a pair of indicia consisting of a first indicia having a low optical density and providing a relatively high transmission of light, and a second indicia disposed adjacent said first indicia, having a high optical density with respect to said first indicia, and providing relatively low transmission of light during the projection of said film, and which is for directing change-over of the projection mode from one to another in a series of continuous information frames, said projection mode information carrying region being provided outside said frame and between the frames where the conversion of the projection mode is scheduled, and further having a first projection mode conversion information carrying region for directing the change-over of said film from its ordinary projection mode to its stop projection mode at a position where said information frames do not overlap each other, a second projection mode conversion information carrying region for directing the change-over of said film from its ordinary projection mode to another projection mode at a projection speed different from the former, and a third projection mode conversion information carrying region for directing the change-over of said film from its ordinary projection mode to its fading mode; and b. a projection apparatus to present said image information on said film, said apparatus having:
1. driving means to actuate said apparatus;
2. intermittent film feeding means, which is actuated by the driving force of said driving means, to intermittently feed said film to said projection position;
3. an optical projection system for projecting said image information recorded on said film, which has been brought to said projection position;
4. light irradiation means, which is actuated by said film feeding means in interrelationship therewith, and to irradiate light onto said film and said projection mode information carrying region for only a predetermined period of time, when said film feeding means has completed feeding said film to said projection position; and
5. information presentation mode conversion means for converting said image information presentation mode of said film, which said apparatus presents, from its ordinary presentation mode to another presentation mode, said conversion means having:

a. stop projection means for converting said film from its state of being fed by said film feeding means at a normal feeding speed to a state where it is not fed for a predetermined period of time, 'said stop projection means including:
1. a first indicia detection means disposed at a position corresponding to the first projection mode conversion information carrying region of said film fed to said projection position, and having light detection elements corresponding in number at least to said first and second indicia portions; and
2. first control means electrically connected to said first indicia detection means for controlling said stop projection means, utilizing an output from said detection means, said control means having an electrical circuit to differentially detect differences in outputs from said light detection elements and to generate a control signal based thereon;

b. projection speed changing means to change-over the speed of said film from its state of being fed by said film feeding means at a normal speed to a projection mode at a projection speed different from that of the former, said change-over means including:
1. a second indicia detection means disposed at a position corresponding to the second projection mode conversion information carrying region of said film fed to said projection position, and having light detection elements corresponding in number at least to said first and second indicia portions;
2. a second control means electrically connected to said second indicia detection means for controlling said projection speed changing means, utilizing an output from said detection means, said control means having an electrical circuit to differentially detect differences in the outputs from said light detection elements and to generate a control signal based thereon; and c. fading projection means for changing over said film from its ordinary projection mode to its fading projection mode by said film feeding means, said fading projection means including:
1. a third signal detection means disposed at a position corresponding to the third projection mode conversion information carrying region of said film fed to said projection position, and having light detection elements corresponding in number at least to the first and second indicia portions; and
2. a third control means electrically connected to said third indicia detection means to control said fading projection means, utilizing an output from the detection means, said controlling means having an electrical circuit to differentially detect differences in the outputs from said light detection elements and to generate a control signal based thereon.

* * * * *